April 9, 1968 L. P. THOMAS 3,377,426
AMPLITUDE LIMITING SIGNAL TRANSLATING CIRCUIT UTILIZING A VOLTAGE DEPENDENT RESISTOR IN THE OUTPUT CIRCUIT
Filed July 16, 1964
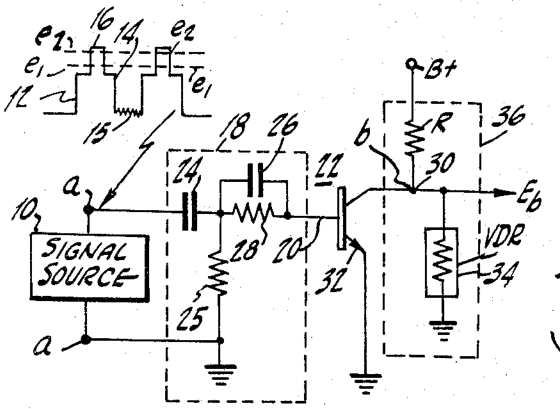
FIG. 1
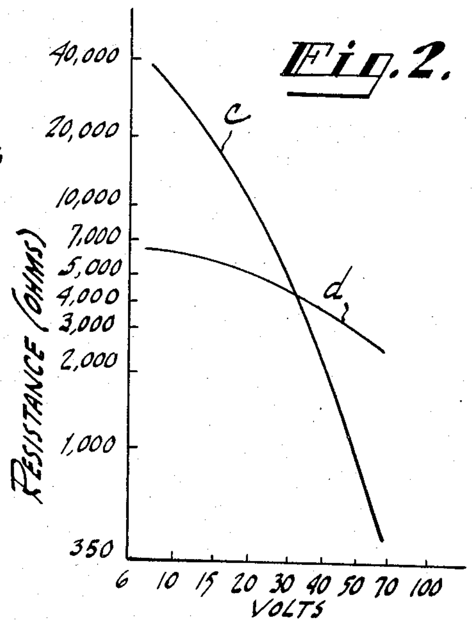
FIG. 2
FIG. 3
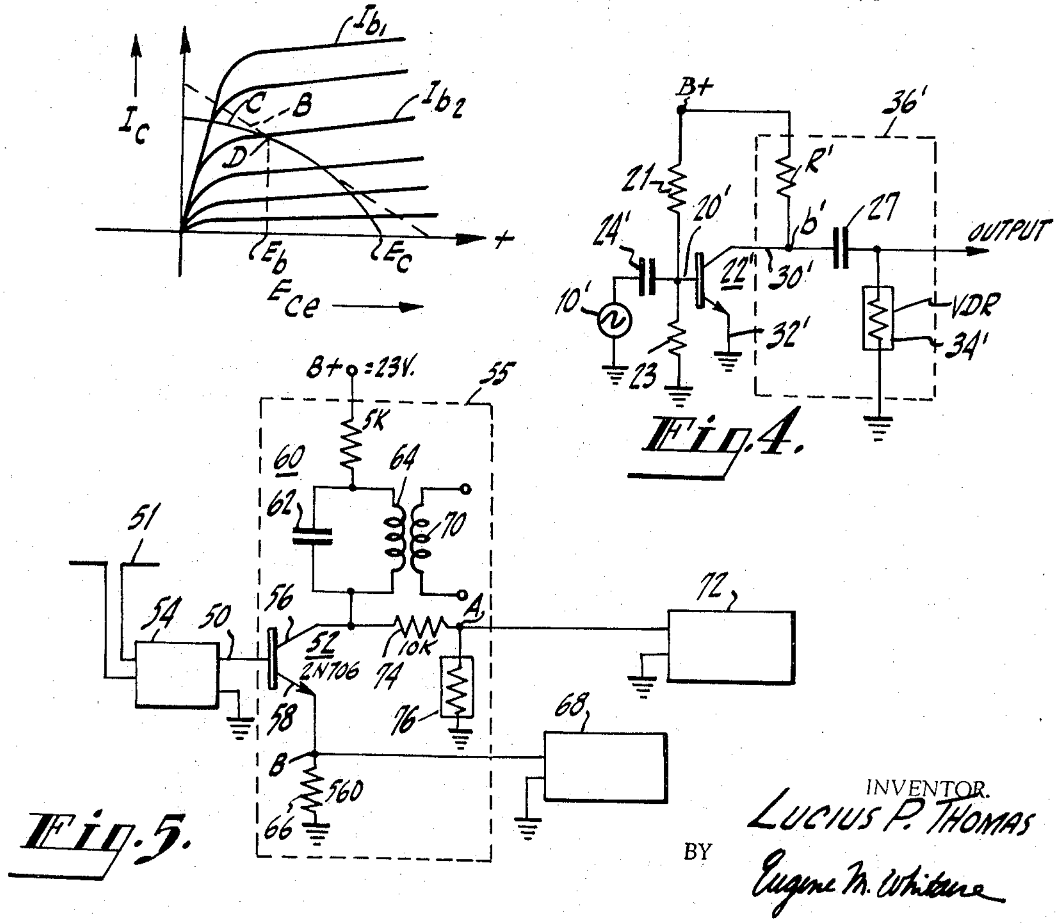
FIG. 4, FIG. 5
INVENTOR.
LUCIUS P. THOMAS
BY Eugene M. Whitacre
Attorney

United States Patent Office 3,377,426

Patented Apr. 9, 1968

3,377,426

AMPLITUDE LIMITING SIGNAL TRANSLATING CIRCUIT UTILIZING A VOLTAGE DEPENDENT RESISTOR IN THE OUTPUT CIRCUIT

Lucius P. Thomas, Indianapolis, Ind., assignor to Radio Corporation of America, a corporation of Delaware Filed July 16, 1964, Ser. No. 383,004
5 Claims. (Cl. 178—7.3)

ABSTRACT OF THE DISCLOSURE

A signal translating circuit including a voltage dependent resistor coupled between, and exhibiting a resistance that varies as a function of the instantaneous voltage developed across, the output and common electrodes of an amplifier device, and means for deriving amplitude limited output signals across that resistor.

This invention relates to signal translating systems and more particularly to circuits for clipping or limiting electrical waves.

A clipping or limiting circuit in accordance with the invention includes an amplifying device having input, output and common electrodes. An input circuit for applying input signals to be clipped or limited is coupled between the input and common electrodes of the amplifying device. A voltage dependent resistor (VDR), also known as a varistor, is coupled to the amplifying device between the output and common electrodes. The voltage dependent resistor exhibits a resistance characteristic which varies as a function of the instantaneous voltage applied thereto in a manner such that as the amplifying device is driven toward saturation, the resistance exhibited by the VDR increases. Thus the limiting by the circuit is enhanced because the amplifying device will be driven into saturation by a smaller change in applied signal voltage than would be required in similar circuits using a fixed resistor. The signal output voltage may be derived across the voltage dependent resistor.

In one embodiment of the invention the circuit is used as a video amplifier stage of a television receiver. The signals translated by the video amplifier stage includes, in addition to the video signal, the 4.5 megacycle intercarrier beat between and sound and picture carriers. A frequency selection circuit connected to the output electrode of the amplifying device removes the intercarrier beat signal, and a voltage divider including a fixed impedance element and a voltage dependent resistor is also coupled to the output electrode of the amplifying device. The video signals are derived across the voltage dependent resistor and are limited in a direction of the synchronizing pulses so as to reduce the effects of noise which would adversely affect the timing of the deflection generators. The limiting action is accomplished without driving the device into saturation, hence the intercarrier beat signal is always present. It should be noted that if the amplifying device were driven into saturation the intercarrier beat signal would be recurrently interrupted causing an objectionable buzz in the sound output from the receiver.

The novel features which are considered to be characteristic of this invention are set forth with particularity in the appended claims. The invention itself, however, both as to its organization and method of operation as well as additional objects and advantages thereof will best be understood from the accompanying drawings in which:

FIGURE 1 is a schematic circuit diagram of a double clipping synchronizing signal separator circuit embodying the invention;

FIGURE 2 is a graph showing the resistance versus instantaneous voltage characteristic of two voltage dependent resistors suitable for use in circuits embodying the invention;

FIGURE 3 is a graph showing the voltage-current characteristics of a transistor and the load line produced by the voltage dependent resistor;

FIGURE 4 is a schematic circuit diagram of a modification of the circuit shown in FIGURE 1; and FIGURE 5 is a schematic circuit diagram of a portion of a television receiver shown partially in block form including a limiting circuit embodying the invention.

Reference is now made to FIGURE 1 of the drawings which is a schematic circuit diagram of a synchronizing signal separator circuit for television receivers. A signal source 10, provides a composite video signal 12 having a blanking level 14 and a synchronizing signal portion 16. The composite signal is applied through a double-time constant network 18 to the base electrode 20 of the transistor 22.

The double-time constant network 18 comprises a series coupling capacitor 24 and a shunt resistor 25, and a capacitor 26 connected in parallel with a resistor 28 between the junction of the capacitor 24 and the resistor 25 and the base electrode 20.

The transistor 22 is connected in the grounded emitter configuration. A source of operating potential B+, not shown, is coupled between the collector and emitter electrodes 30 and 32 through a fixed linear resistor R. The separated synchronizing pulses are derived across a voltage dependent resistor (VDR) 34 connected between the collector and emitter electrodes 30 and 32.

The voltage-current characteristic of a VDR element, such as the VDR 34 for example, is approximated by the equation $I=KE^n$; where I and E are respectively the instantaneous current through the VDR and the instantaneous voltage across the VDR, K is the constant amperes at one volt, and $n$ is an exponent dependent upon the composition of the VDR and upon the voltage gradient.

The resistance versus instantaneous voltage characteristics of two different VDR elements, which may be employed in circuits embodying the invention, are illustrated in curves $c$ and $d$ of FIGURE 2 of the drawings. Voltage dependent resistors exhibit little or no change in resistance or in characteristic with time and have substantially instantaneous response to short duration impulses.

In operation, the composite video signal 12 is applied to the transistor 22 through the double-time constant network 18. The video signal includes a train of relatively narrow horizontal synchronizing pulses 16 and relatively wide vertical synchronizing pulses (not shown).

The synchronizing pulses cause base 20 to emitter 32 conduction, and charge up the capacitors 24 and 26 to provide a net reverse bias voltage of a value approximating the level of the blanking pedestal 14. As a result, the transistor 22 is cut-off for all of that portion of the composite signal below a threshold which is shown in the waveform of FIGURE 1 as voltage $e_1$.

When the synchronizing pulse excursions exceed the voltage $e_1$, the transistor 22 conducts, and amplifies the synchronizing pulse. As the collector current increases, the collector voltage drops, thereby resulting in an increase in the resistance of the VDR 34. The increased resistance of the VDR 34 provides effectively more collector load resistance for the transistor 22, which permits the transistor to saturate at a lower collector voltage.

By way of example, the transistor 22 is indicated as being in saturation when the applied signals have an amplitude $e_2$.

Reference is now made to FIGURE 3 of the drawings, wherein the idealized voltage-current characteristic of the transistor 22 and the load line of the VDR 34-resistor R combination, are illustrated.

The collector voltage $E_c$ at cut-off is determined by the voltage divider action of the VDR 34 and the resistor R. The load line of the VDR 34-resistor R combination is illustrated by the curve C. If the VDR 34 is replaced by a fixed resistor having a resistance value equal to that of the VDR at the operating point D, the load line would be as shown by the dashed line B.

The point D represents an operating point of the transistor 22 for an input signal level intermediate the signal levels $e_1$ and $e_2$, which correspond respectively to cut-off and saturation. By comparison of the load line C with the load line B, it can be seen that the VDR 34-resistor R combination causes the transistor 22 to saturate with less drive and at a lower collector current. It may also be noted that the transistor cuts-off more rapidly.

Thus as described, the circuit of FIGURE 1 provides a double clipping action, in that the transistor 22 is cut-off for signals below the level $e_1$ and saturated for signals above the level $e_2$. The enhanced clipping action provided by the VDR 34 in the circuit is of particular significance in limiting impulse noise which may extend well beyond the peak amplitude of the synchronizing pulses. In so limiting the noise impulses, the adverse effect of noise on the timing of the deflection generators is reduced.

A limiter circuit embodying the invention is shown in FIGURE 4 of the drawings. Signals from the source 10' are applied through the capacitor 24' to the base electrode 20' of the transistor 22'. The transistor 22' is biased for conduction in the center of its linear operating region by a voltage divider comprising a pair of resistors 21 and 23. The output circuit differs from that shown in FIGURE 1 in that a capacitor 27 couples the VDR 34' to the collector 30'.

In the operation of the circuit shown in FIGURE 4, the transistor 22' is normally conductive in the absence of input signals or for very small level input signals. Positive going input signals from the signal source 10' drive the transistor into saturation following a load line similar to the load line C, shown in FIGURE 3 of the drawings. Rectification of the signals through the base 20' emitter 32' path charges the capacitor 24' to provide a bias as a function of signal level so that signal excursions in the negative direction beyond a given level cut-off the transistor. Because the resistance of the VDR 34' increases as a function of the decrease in the signal voltage across the transistor, the transistor 22' is driven quickly into saturation, as previously described, enhancing the limiting of the output signal. The output signals derived across the VDR 34', however, are not referenced to the collector voltage of the transistor 22' because of the capacitive impedance element 27, but are referenced to ground potential.

FIGURE 5 of the drawings illustrates a limiting circuit embodying the invention and which may be employed as the first video amplifier stage in a television receiver, for example.

Input signals are received by an antenna 51 and applied to the superheterodyne television receiver which includes a tuner, an intermediate frequency channel and a second detector, all represented in the drawing by a single block 54. These circuits are conventional and need not be described in detail.

The output from the second detector circuit is applied to a video amplifier stage, from which the sound output signal and the composite video signal including vertical and horizontal synchronizing pulses, are derived for further utilization in the television receiver in accordance with the usual practice.

The circuit 55 includes a transistor 52 having base, collector and emitter electrodes 50, 56 and 58 respectively. The collector electrode 56 is connected through a tuned circuit 60, including a capacitor 62 and an inductor 64, and a resistor 65 to a source of operating potential B+, not shown. The tuned circuit 60 is resonant at 4.5 mc. which is the frequency difference between the sound and picture intermediate frequency carriers.

The emitter electrode 58 is coupled through a resistor 66 to ground. Output signals are derived across the resistor 66 and applied to a further video amplifier 68 shown in block form.

The intercarrier sound signal is derived by the transformer action provided by windings 70 and 64. The intercarrier sound signal is demodulated in the sound channel of the television receiver, not shown, and ultimately used to drive a loudspeaker.

The composite video signal is applied with positive going synchronizing pulses to a conventional synchronizing signal separator circuit 72 from the collector electrode 56 of the transistor 52 through a resistor 74. A VDR 76, connected between the input terminal A of the synchronizing signal separator circuit 72 and ground, forms a voltage divider network with the resistor 74 and provides limiting of the composite video signal applied to the synchronizing signal separator circuit 72.

In operation, the circuit shown in FIGURE 5 provides limiting of the signal at point A, to minimize the undesirable effects caused by impulse noise present in the video signal in the deflection circuits. The VDR 76 in the circuit provides limiting of the video signal at point A substantially without limiting the sound signal. Saturation of the transistor 52 interrupts the intercarrier beat signal causing distortion or buzz at the rate of the interruptions.

The video signal derived from the second detector circuit has opposite polarity to the polarity of the video signal 12, shown in FIGURE 1. An increase in the input signal in the negative direction decreases the conduction of the transistor 52, which is biased to be normally conductive by an appropriate bias circuit not shown, and hence increases the voltage across the resistor 74-VDR 76 combination. Consequently, the instantaneous voltage across the VDR 76 is increased which causes the VDR 76 to exhibit a smaller resistance. This results in the compression of the positive going signal voltage excursions at point A and of the impulse noise present in the input signal substantially without affecting the sound signal.

Some values of the elements illustrated in FIGURE 5 are shown therein as an example of a circuit that may be employed in a television receiver.

What is claimed is:

1. A signal translating circuit comprising in combination:

an amplifier device having input, output and common electrodes, an input circuit coupled between said input and common electrodes, and a voltage dependent resistor coupled between said output and common electrodes, said resistor exhibiting a resistance that varies as an inverse function of the voltage developed acros said output and common electrodes, and means for deriving amplitude limited output signals across said voltage dependent resistor.

2. A signal translating circuit comprising in combination:

a transistor having base, emitter and collector electrodes, a signal input circuit coupled between said base and emitter electrodes, means including a first resistor and a source of operating potential supply connected to said collector electrode, a voltage dependent resistor coupled between said collector and emitter electrodes, said resistor exhibiting a resistance that varies as an inverse function of the voltage developed across said collector and emitter electrodes, and means for deriving amplitude limited output signals across said voltage dependent resistor.

3. A double clipping synchronizing signal separator comprising in combination:

a transistor having base, emitter and collector electrodes, means providing an input circuit including a resistance-capacitance time constant network connected between said base and emitter electrodes for developing a bias voltage as a function of the peak level of signals applied to said input circuit, output circuit means including a fixed linear resistor and a source of operating potential connected in series between said collector and emitter electrodes, and a voltage dependent resistor connected in parallel with the series combination of said fixed linear resistor and source of operating potential, said voltage dependent resistor exhibiting a resistance characteristic which decreases as the voltage across said voltage dependent resistor is increased, and utilization circuit means coupled between said collector and emitter electrodes.

4. A signal limiting circuit comprising:

an active device including input, output and common electrodes, resistance-capacitance input circuit means coupled between said input and common electrodes, output circuit means including a fixed linear resistor and a source of operating potential connected in series to said collector electrode, and a voltage dependent resistor and a capacitor connected in series between said output and common electrodes, with said voltage dependent resistor exhibiting a resistance that varies as an inverse function of the voltage developed across said output and common electrodes, and utilization means coupled across said voltage dependent resistor, and to the junction between said resistor and said capacitor, for deriving amplitude limited output signals.

5. A video amplifier for intercarrier television receivers compriisng:

a transistor having base, emitter and collector electrodes, input circuit means for applying a composite video signal between said base and emitter electrodes, a resonant circuit tuned to the frequency of an intercarrier beat signal and a source of operating potential connected between said emitter and collector electrodes, a fixed linear resistor and a voltage dependent resistor connected in series between said collector and emitter electrodes, said voltage dependent resistor exhibiting a resistance which increases as the voltage across said voltage dependent resistor decreases and synchronizing signal separator means coupled to receive the composite video signal developed across said voltage dependent resistor, and means providing a sound channel coupled to receive the intercarrier beat signal developed across said resonant circuit.

References Cited

UNITED STATES PATENTS

| | | | |
|---|---|---|---|
| 2,410,489 | 11/1946 | Fitch | 325—46 |
| 3,109,103 | 10/1963 | Wilhelmsen | 330—29 |

FOREIGN PATENTS

| | | |
|---|---|---|
| 845,092 | 8/1960 | Great Britain. |

ROBERT L. GRIFFIN, *Primary Examiner.*

JOHN W. CALDWELL, *Examiner.*

R. L. RICHARDSON, *Assistant Examiner.*